May 21, 1940.  A. G. SIEBENLIST  2,201,409
LOCK JOINT FOR SHEET METAL
Filed May 4, 1938  2 Sheets-Sheet 1

INVENTOR
Anthony G. Siebenlist
BY Fred G. Parsons
ATTORNEY

May 21, 1940.  A. G. SIEBENLIST  2,201,409
LOCK JOINT FOR SHEET METAL
Filed May 4, 1938  2 Sheets-Sheet 2
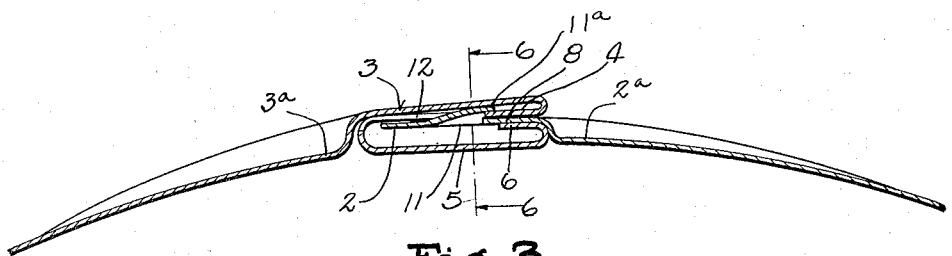
Fig. 3.
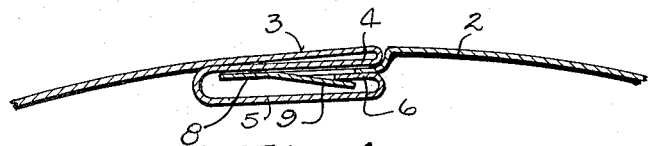
Fig. 4.
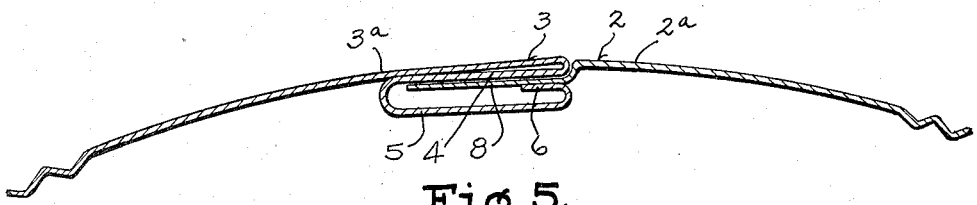
Fig. 5.
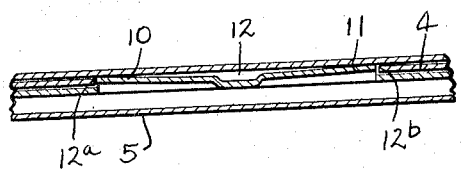
Fig. 6.
Fig. 7.
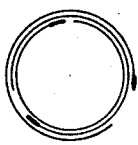
Fig. 8.
INVENTOR
Anthony G. Siebenlist
BY
Fred G. Parcous
ATTORNEY Patented May 21, 1940

2,201,409

UNITED STATES PATENT OFFICE 2,201,409

LOCK JOINT FOR SHEET METAL

Anthony G. Siebenlist, Milwaukee, Wis., assignor to Milcor Steel Company, Milwaukee, Wis., a corporation of Delaware Application May 4, 1938, Serial No. 205,998

3 Claims. (Cl. 138—74)

This invention relates to joints or seams for joining the edges of thin metal sheets, and more particularly for sheet metal pipe, such as stovepipe or the like.

Among the objects of the invention are to provide a joint which may be easily and quickly effected without the use of special tools and which when assembled is permanent and substantially leak-proof and rigidly resistant to any material relative displacement of the joined sheets. It is a particular object of the invention to provide an improved longitudinal joint or seam for stovepipe, which will permit joining of the edges at the place of sale or use and which when joined will provide a substantially leak-proof structure rigidly prevented from opening up at the joint and likewise prevented from any longitudinal shifting of the joined edges relative to one another, such for example as might otherwise occur in the forcing of the end of one section of pipe inside another adjacent section.

A further purpose, particularly relating to sheet metal pipe, such as stovepipe and the like, is to effect an improved longitudinal joint in such manner that one end of each pipe section is adapted to be fitted within a similar pipe section, and the other end of the same section is adapted to receive a similar pipe section, while maintaining the resulting pipe section substantially leak-proof at the joint formed between the telescoped portions in spite of the thickness of the longitudinal seam.

Another object is to improve upon the locked joint of my previous Patent No. 2,038,389, issued April 21, 1936, particularly in preventing relative longitudinal movement of the joined edges, and particularly in providing an end structure for telescoping the end portions of adjacent pipe sections while maintaining a tight joint at the telescoped portion.

Another object is generally to simplify and improve the construction and operation of joints between metal sheets and still other objects will be apparent from this specification.

The invention resides in the structure herein illustrated, described and claimed, together with such modifications of the structure illustrated and described as may be equivalent to the structure of the claims.

Throughout the specification the same reference characters have been used for the same parts, and in the drawings.

Figure 1:
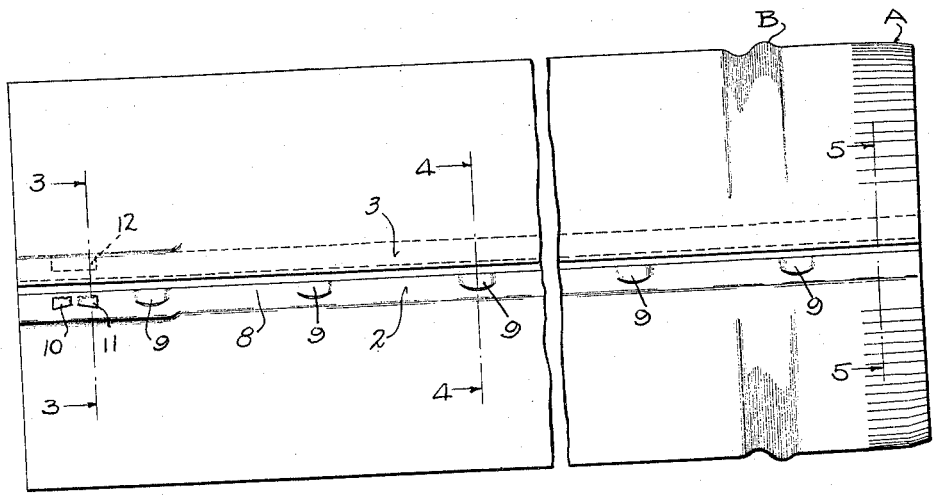
Figure 1 is a view of a section of stovepipe incorporating the invention, the longitudinal joint being shown open.

Figures 3, 4 and 5 are enlarged transverse sections, respectively taken along the lines 3—3, 4—4 and 5—5 of Fig. 1, but with the longitudinal joint closed.

Figure 6 is a fragmentary longitudinal section of the closed joint taken along line 6—6 of Fig. 3.

Figure 7 is a diagram indicating the relative overlapping of seams of longitudinally telescoped pipe sections of the type herein shown.

Figure 8 is a diagram indicating the manner in which sheet metal pipe sections of the type herein shown may be nested for shipment.

The pipe section shown in Fig. 1 is made of an appropriate thickness of metal sheet formed to approximate a circle of the desired pipe diameter. The adjacent longitudinal edges of the metal sheet are formed to be interlockingly fitted together, the one edge, generally identified by the numeral 2 being adapted to enter between suitable folds in the other edge generally identified by the numeral 3.

Figure 2:
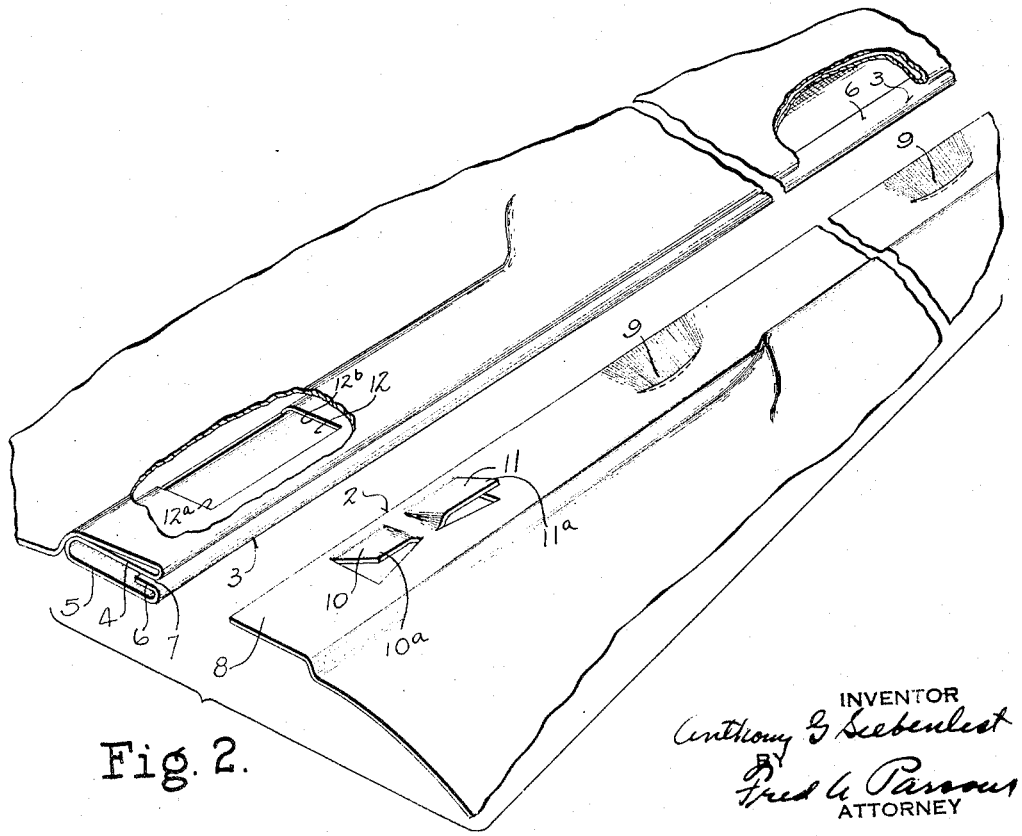
Figure 2 is an enlarged fragmentary perspective view of the left end portion of the pipe shown in Fig. 1.

The folded edge 3 includes a folded portion 4, Fig. 2, inwardly and rearwardly extended, a return folded portion 5 and another folded portion 6. The folding provides a groove or slot 7 adapted to receive the portion 8 of the edge 2 throughout the length of the joint, and to resiliently and frictionally engage therewith.

At spaced intervals along the edge 2 there are formed lug or hook portions 9, 9, etc., these being formed by displacing the sheet metal inwardly sufficiently that they may engage with and hook over the inner edge of the folded portion 6, as shown in Fig. 4, when the portion 8 is assembled between the portions 4 and 6. The engagement of these hook or lug portions 9 with the portion 6 locks the two edges against subsequent disengagement.

At the left hand end, Fig. 1, there are struck out from the portion 8 a plurality of lug or ear portions 10, 11. In the folded portion 4 metal is cut away to form a slot or socket 12, Figs. 2 and 3. When the portion 8 has been shoved forward, as previously described, to interlock the joint, the lugs 10 and 11 are received between the end faces 12a and 12b of the slot 12, the lugs springing outwardly into the slot and fitting sufficiently closely to prevent subsequent relative longitudinal movement of the interlocked edges.

Pipe sections of the type herein shown are intended to effect any desired length of conduit by telescoping one end of the section, such as the right hand end of Fig. 1, inside the adjacent left hand end of a similar section, the sections being crimped, as at A, Fig. 1 for easy starting of the telescoping, and provided with an enlargement, as at B, Fig. 1 to limit the amount of telescoping. During the telescoping there is considerable outward force tending to distort the joint. The interlocking of lugs 9 on the folded portion 6 as shown in Fig. 4 cannot always be relied upon to prevent outward distortion of the sheet metal of the edge 3, particularly since the resistance to this particular type of distortion is reduced by the combined resiliency of the folded portions 4, 5 and 6. In order to apply resistance to such distortion at a point which substantially avoids the resiliency of the folded portions the lugs 10, 11 are formed with the corners 10a, 11a projecting to engage outside the folded portion 4, in the manner shown for the corner 11a in Fig. 3.

It will be apparent that both the lug or hook portions 9, 9 and the lug or ear portions 10, 11 operate to prevent lateral disengagement of the assembled edges to the right or left in Figs. 3, 4. Both types also prevent relative displacement of the edges upwardly or downwardly in Figs. 3, 4, but the structure of Fig. 3 is preferable in some respects, particularly at the end of the pipe section which telescopes outside adjacent similar sections for reasons just explained. Only the lugs of the type 10, 11 operate to prevent relative longitudinal displacement of the edges, this effect resulting in part from the form of the lugs and in part from their longitudinal fit within the slot 12. It will be apparent that, if desired, the entire length of the joined edges may be locked by the use of suitably spaced lugs such as 10, 11, providing that the edge 3 provides correspondingly spaced recesses or slots, such as 12.

Where sheet metal pipe sections are formed with a relatively thick longitudinal seam or joint, and the desired length of conduit is obtained by telescoping the one end of a pipe section inside the end of an adjacent section, the thickness of the folded and engaged metal portions which form the seam is, unless prevented, the cause of objectionable leaks at the telescoped joint between sections. In a stovepipe for example such leaks may permit smoke or gas to escape or, if the conduit is of any considerable length, may materially reduce the effective chimney draft. The improved longitudinal joint herein disclosed avoids such leaks in the following manner:

At the end of the pipe section which is intended to telescope or engage inside of an adjacent section the portion 8 of the edge 2 is formed inwardly relative to the metal sheet, sufficiently that the outer surfaces 2a and 3a of the joint may substantially coincide with a circle of the same diameter as the exterior of the outside pipe at this point in spite of the thickness of the seam, which otherwise would prevent the pipe exterior from assuming a circular exterior form.

At the other end of the pipe section, that is to say at the end which telescopes or engages outside the end of an adjacent pipe section, the portion 8 is formed outwardly and the edge 3 is offset outwardly, as shown in Fig. 3, sufficiently that the inner surface of the seam may substantially coincide with a circle of the same diameter as the interior of the pipe at this point in spite of the thickness of the seam, which would otherwise prevent the pipe interior from assuming circular form.

The construction just referred to may be readily understood by comparison of Figs. 3 and 4 of the drawings.

By the means just described, the resiliency of the thin metal of the pipe being taken into consideration, the outside of the end portion which is intended to telescope inside an adjacent section of pipe may conform exactly to form a tight joint with the inside of the adjacent pipe end with which it is telescoped, and leaks or openings are prevented at these joints as well as along the longitudinal seam.

Sheet metal stove pipe is preferably shipped from its point of origin with the seam edge portions open in order that several sections may be nested together as diagrammatically indicated in Fig. 8. The seam construction and edge lock means herein shown is particularly useful since it facilitates seam assembly at point of use by engaging the edges sidewise and also insures that the engaged edges will be positioned both laterally and longitudinally as intended by the manufacturer. Furthermore the relative offsetting of the sheet in the manner herein disclosed, whereby to effect a tight joint between telescoped adjacent pipe sections, is particularly useful in that the offsetting of the sheet, instead of the seam, permits the result while maintaining a straight-line seam, which is particularly desirable, in part for reasons of appearance of the assembled pipe sections and in part for purposes of nested shipment, as mentioned. Moreover the straight line seam is more convenient for lateral assembly of the edge into the seam slot at point of use. It results, of course, that the seams of sections assembled to form a pipe line have a slight relative angle, as indicated in exaggerated form in the diagram of Fig. 7, but this angle is not objectionable, since it is too slight to be apparent in the resulting pipe line and the thin sheet metal employed for stove pipe is sufficiently resilient for the pipe line exterior to assume a form presenting a substantially cylindrical appearance throughout.

It will be understood that the novel results effected by the specific structure here shown and described may be effected in various structural modifications. My invention includes each of such modifications, so far as they lie within the scope of the claims.

What is claimed is:

1. In a sheet metal pipe section the combination of a longitudinal joint comprising a longitudinally extended edge of the sheet folded and refolded to provide a longitudinal slot and another longitudinally extended edge engaging in said slot, one of the side walls of said slot being recessed to form longitudinally spaced and oppositely directed abutment edges, said other longitudinally extended edge providing portions struck up from the plane of the metal to provide longitudinally spaced edges free of the sheet stock and respectively adapted to engage different of said oppositely directed abutment edges whereby to collectively prevent relative longitudinal movement of said engaged edges.

2. In a sheet metal pipe section the combination of a longitudinal joint comprising a longitudinally extended edge of the sheet folded and refolded to provide a longitudinal slot and another longitudinally extended edge engaging in said slot, said other longitudinally extended edge providing portions struck up from the plane of the metal to form longitudinally spaced abutment edges free of the sheet stock, and an interior side wall of said slot adjacent the exterior pipe sheet being apertured to provide oppositely directed longitudinally spaced abutment edges respectively engaging with different of the first mentioned abutment edges during engagement of said other longitudinally extended edge with said slot to prevent relative longitudinal movement of the engaged longitudinally extended edges.

3. A sheet metal stove pipe section of generally cylindrical form in which one longitudinal edge of the pipe sheet is folded to provide a slot opening in the direction of the other edge and engaged thereby to form a longitudinal seam having a radial thickness materially greater than the thickness of the pipe sheet, said seam being of substantially straight line longitudinal extension throughout the length of the section, said pipe sheet being relatively offset to stand substantially flush with the exterior of said straight line seam in the sheet portions adjacent thereto at the one end of the pipe section, and relatively offset to stand substantially flush with the interior of said straight line seam in the sheet portions adjacent thereto at the other end of the pipe section.

ANTHONY G. SIEBENLIST.